Aug. 28, 1951 W. J. DUHAMEL 2,565,956
FISH BAITER
Filed July 13, 1948
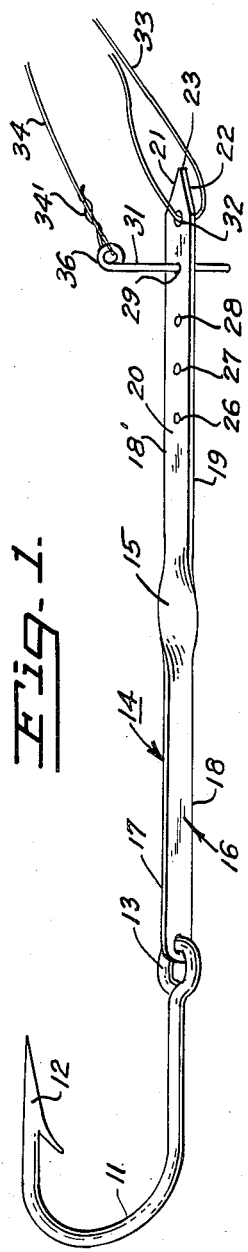
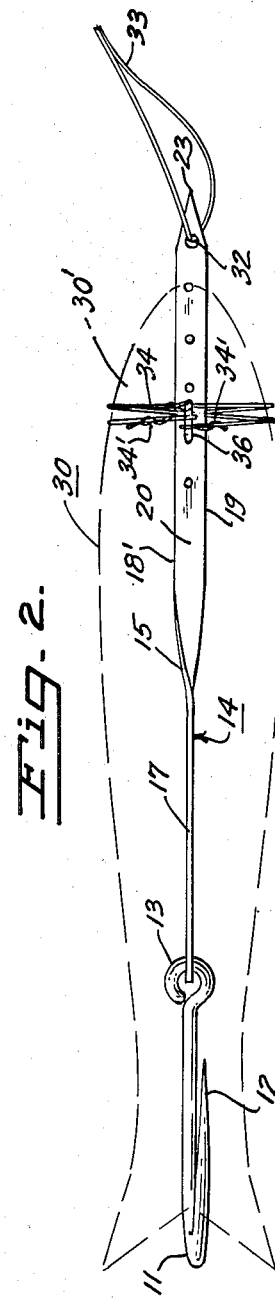
INVENTOR.
WILFORD J. DUHAMEL
BY
ATTORNEY Patented Aug. 28, 1951

2,565,956

UNITED STATES PATENT OFFICE 2,565,956

FISH BAITER

Wilford J. Duhamel, Oakland, Calif., assignor to Chas. Duhamel and Son, San Francisco, Calif., a firm Application July 13, 1948, Serial No. 38,450

1 Claim. (Cl. 43—44.4)

The invention, in general, relates to fishing paraphernalia and more particularly relates to an improved bait fish hook especially suitable in trolling although equally suitable for other modes of fishing.

Heretofore, there has been some attention devoted to the development and provision of various types of fish hooks as well as bait lure to enchance the catching of fish. These prior devices, in the main, inherently are ineffective to maintain the bait in position on the hook for attracting the fish to be caught. Some of these prior devices are of such complex construction as to limit their marketability because of prohibitive manufacturing costs and resulting high sales prices. The present invention is directed to the provision of an improved baiter obviating inherent disadvantages of these aforementioned prior devices and largely benefiting amateur fishermen who cannot satisfactorily use the complicated bait fish hooks presently marketed.

A primary object of the present invention is to provide an improved bait fish hook which affords ready and easy impaling of a bait thereon as well as effective maintenance of the bait in proper position for attracting fish to be caught.

Another object of the invention is to provide an improved fish baiter of the indicated nature which is additionally characterized by its ease of handling and its high effectiveness in use.

A still further object of my invention is to provide an improved fish baiter of the aforementioned character which is relatively inexpensive to manufacture and which is of relatively simple construction.

Other objects of the invention, together with some of the advantageous features thereof, will appear from the following description of a preferred embodiment as well as a modified embodiment of the invention which are illustrated in the accompanying drawings. It is to be understood that I am not to be limited to the precise embodiments shown, nor to the precise arrangement of the various elements thereof, as my invention, as defined in the appended claim, can be embodied in a plurality and variety of forms.

Referring to the drawings:

Fig. 1 is a perspective view of the preferred embodiment of the present invention.

Fig. 2 is a longitudinal plan view of a preferred embodiment of the invention, together with a showing, in side elevation, of a bait lure; this view illustrating the invention as used.

In its preferred form, the fish baiter of my invention preferably comprises a curved barbed hook portion, an elongated, twisted shank portion detachably connected to said hook portion; said shank portion having a plurality of holes therethrough for selectively receiving a bait-holding pin, together with means on said shank portion for connecting the baiter to a fishing line or to a snell connected to the line.

As illustrated particularly in Figs. 1 and 2 of the annexed drawings, I provide in the preferred embodiment of the invention a fish baiter consisting of a curved hook portion 11 formed with an integral barb 12 and conveniently formed with also an eyelet 13 thereon whereby the hook portion may be detachably fastened to the baiter. My improved baiter also includes an elongated shank portion which is designated generally by the reference numeral 14 and which preferably is formed with a twist therein at its approximate longitudinal center, although the location of the twist is not critical nor is the degree of the twist critical. As shown, the shank portion 14 is provided with a 90 degree twist 15 with the result that there is formed a length 16 of the shank portion having its lateral extremities or edges 17 and 18 disposed at right angles to the lateral extremities or edges 18' and 19 of the balance or length 20 of the shank portion 14 of the baiter. In other words, the lateral extremities 17 and 18 of length 16 of the shank portion are in alignment with a rearward colinear extension of the longitudinal axis or center of the length 20 of the shank portion 14, and the lateral extremities 18' and 19 of the length 20 are in alignment with a forward colinear extension of the longitudinal axis or center line of the length 16 of the shank 14.

In accordance with my present invention, the extremity of shank portion 14 which is remote from the curved barbed hook portion 11 is cut on a taper from both lateral extremities thus affording taper lengths or edges 21 and 22 which terminate and meet in a pointed tip 23. In addition, the shank portion 14 of my improved fish baiter is formed with a plurality of relatively small holes 26, 27, 28 and 29 therethrough for selectively passing a pin 31 for holding bait 30, such as a sardine, a minnow or herring, depending upon the type of fish desired to be caught, upon the baiter in a proper position for attracting the fish to be caught, all as hereinafter explained. Moreover, the shank portion is provided, preferably adjacent to the tip 23 thereof, with a relatively large hole 32 for tying a fishing line, not shown, to the baiter or for attaching the baiter to a snell or leader 33 connected to the fishing line.

As illustrated in Figs. 1 and 2 of the drawings, the pin 31 is provided with a looped end 36 defining an eyelet in which a length of wire 34 is secured which, together with the pin 31, serves to hold the bait lure 30 in attractive positions firmly on the fish hook or baiter of the present improvement. The pin 31 is first passed through the flash of the bait 30 and through any selected one of the relatively small holes, 26, 27, 28 or 29 with the looped end 36 of the pin 31 on which the wire 34 is carried engaging the bait lure 30 and limiting the depth of penetration of the pin 31 into the body of the bait lure. It is only necessary then to wind the wire 34 about the head 30' of the fish bait 30 and coil the wire about itself, as at 34', to effect a tie-knot, and thus effectively secure the lure 30 in position on the baiter for fishing.

The fish baiter of the present invention preferably is fabricated, as to its shank portion 14, from relatively thin section, bendable metal so that the twist 15 therein is readily formed and so that the lateral extremities or edges of the lengths 16 and 20 of the shank portion are relatively sharp, or in the nature of knife edges. The sharpness of the edges of the shank portion 14, together with its pointed tip 23, effectively aid the disposition of the baiter within the body of the bait lure 30, and preferably this is accomplished by leading the shank portion from the tail of the lure 30 and shoving the shank 14 through the body of the fish bait to an extent that will bring the eyelet 13 of the barbed hook portion 11 within the body of the lure 30 adjacent to its tail with the pointed tip 23 of the shank 14 to a point adjacent to the mouth of the bait. Thereafter, to mount and secure the bait lure 30 in position, it only is necessary to push the pin 31 through the flesh of the lure and through one of the relatively small holes provided in length 20 of the shank, and wind the wire 34 around the mouth end of the lure and upon itself to provide the tie-knot 34', as shown in Fig. 2 of the accompanying drawings.

The improved fish baiter of my present invention tends to conserve bait since the bait lure is firmly held on the baiter as indicated, and thus affords a much longer trolling life per unit of bait lure.

It is to be understood that the appended claim is to be accorded a range of equivalents commensurate in scope with the advance made over the prior art.

I claim:

A fish baiter comprising, in combination, a flat elongated strip terminating at one end in a pointed tip and having a relatively large hole therethrough adjacent to said tip for attaching the strip to a leader, as well as having a plurality of relatively small holes therethrough arranged in spaced relationship longitudinally thereof; said strip being adapted to be passed longitudinally through a fish bait, a fish bait piercing pin terminating at one end in a loop for limiting the depth of penetration of the pin into the body of the fish bait, and a length of wire secured to the loop of said piercing pin; said pin being adapted to be passed through a fish bait and through any selected one of said small holes in said strip for securing the bait firmly to said strip with said length of wire wrapped around the bait after said strip has been passed therethrough.

WILFORD J. DUHAMEL.

REFERENCES CITED

The following references are of record in the file of this patent:

UNITED STATES PATENTS

| Number | Name | Date |
|---|---|---|
| 261,194 | Wylly | July 18, 1882 |
| 788,296 | West | Apr. 25, 1906 |
| 1,152,698 | Bonner | Sept. 7, 1915 |
| 1,566,059 | Willson | Dec. 15, 1925 |
| 1,742,934 | Richardson | Jan. 7, 1930 |
| 1,921,657 | Catarau | Aug. 8, 1933 |
| 1,993,582 | Anderson | Mar. 5, 1935 |

FOREIGN PATENTS

| Number | Country | Date |
|---|---|---|
| 27,355 | Switzerland | Apr. 20, 1903 |
| 226,687 | Great Britain | Jan. 1, 1925 |